July 12, 1932.　　　G. E. KRIDER　　　1,867,081

GRINDING PAN

Filed Feb. 14, 1930　　　2 Sheets-Sheet 1

Inventor

George E. Krider

By Clarence A. O'Brien

Attorney

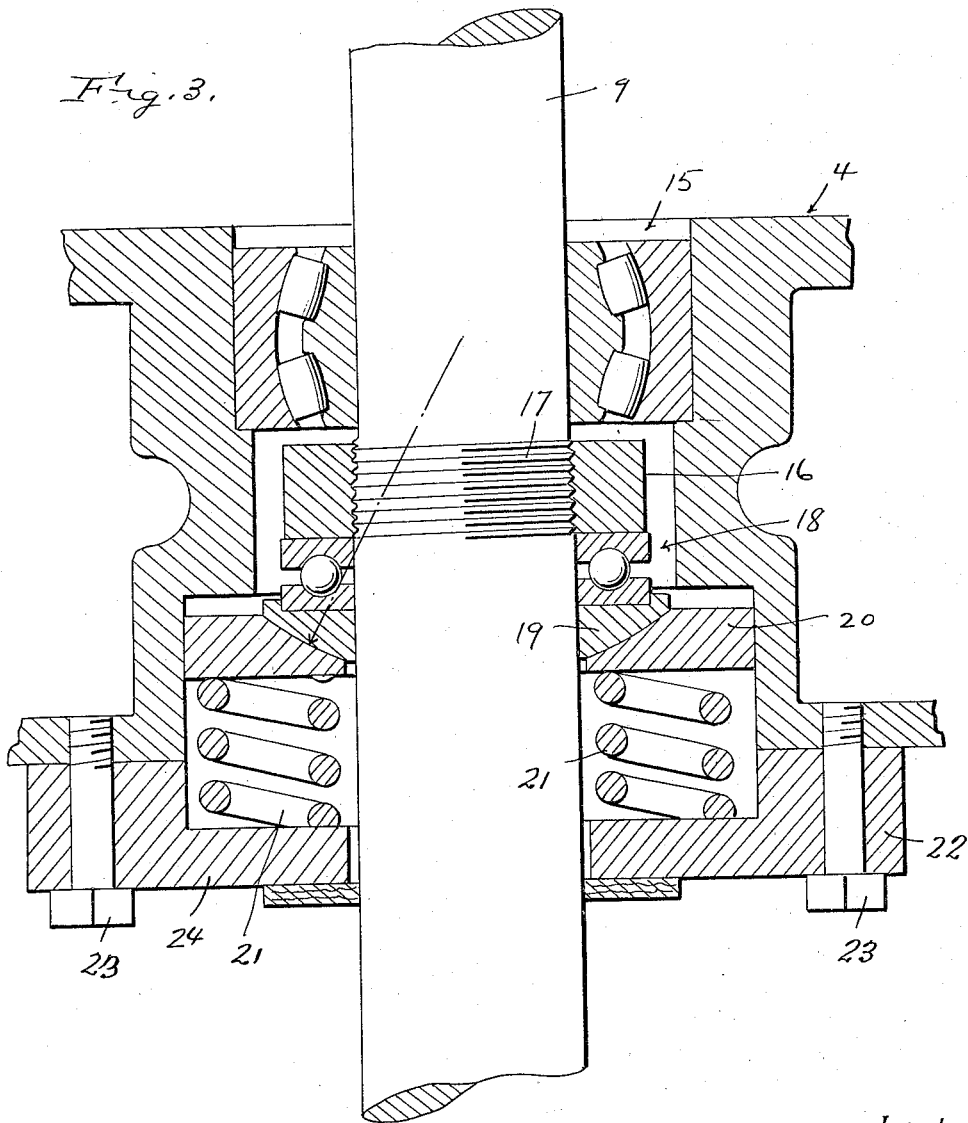

Patented July 12, 1932

1,867,081

UNITED STATES PATENT OFFICE

GEORGE E. KRIDER, OF DUNCANSVILLE, PENNSYLVANIA, ASSIGNOR TO McLANAHAN & STONE CORPORATION, OF HOLLIDAYSBURG, PENNSYLVANIA, A CORPORATION OF PENNSYLVANIA

GRINDING PAN

Application filed February 14, 1930. Serial No. 428,422.

This invention relates to certain refinements and improvements in the construction of grinding machines frequently referred to in the trade as a grinding pan.

It is submitted that with the conventional type of machine, particularly, the so-called dry pan, the main thrust bearing for the propulsion shaft is placed at the bottom in a socket forming base and is required to take practically all of the wear and weight and this is excessive as a general rule.

It has been regarded as impractical to place two thrust bearings in the machine for the reason that they cannot be fitted accurately, causing the wear to fall upon either one or the other of these thrust bearings.

With the foregoing objections in mind, I have evolved and produced certain refinements and improvements in the bearing structures designed with a view toward equalizing and distributing the stress and strain in a uniform manner and to permit self-alining of the pan carrying shaft.

The foregoing are accomplished through the medium of a structural organization of novel details such as will be hereinafter made evident.

In the drawings:

Figure 3 is an enlarged sectional view showing the details of the supplemental bearing structure.

Figure 1:
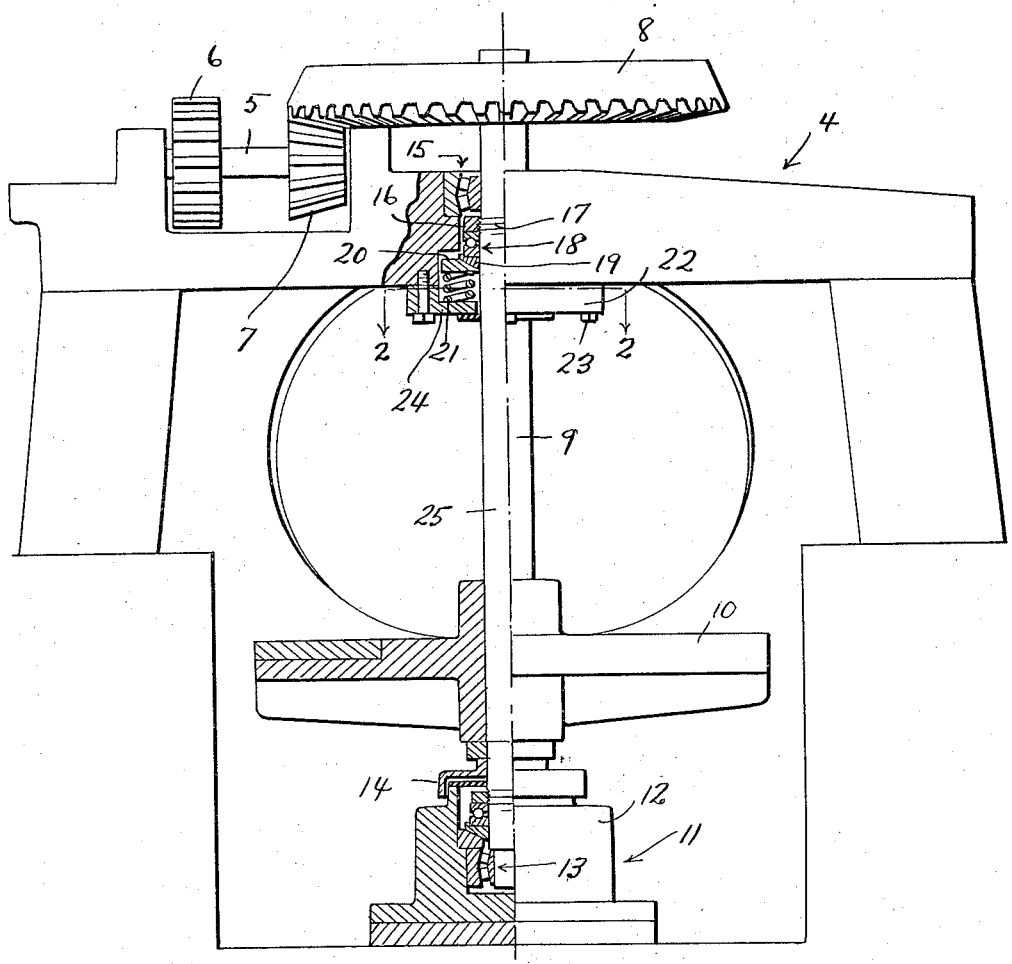
Figure 1 is a view in section and elevation showing a conventional grinding pan or machine with the improved supplemental bearing incorporated therein at the upper end portion of the shaft.
Figure 2:
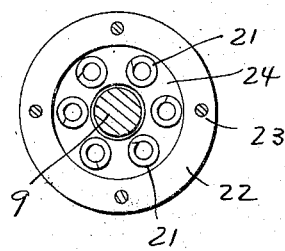
Figure 2 is a horizontal section on the line 2—2 of Figure 1.

In the drawings in Figure 1, the reference character 4 designates the conventional frame carrying the pinion shaft 5 having the usual gear 6 at one end, and the bevelled pinion 7 at the other end, said pinion being in mesh with the bevelled gear 8 carried by the upper end of the vertical or perpendicular shaft 9. The pan is represented at 10 and the numeral 11 designates generally the base. This includes a bearing receptacle or socket 12, having the end thrust bearing assembly 13 incorporated therein in the usual way. This is the self-alining type of thrust bearing. The numeral 14 merely designates the thrust cap.

That portion of the shaft which extends through the aperture at the center of the frame cooperates with a self-alining roller bearing race or assembly generally represented by the numeral 15. My improvement is predicated upon the provision of a hanger bearing which cooperates with the thrust bearing in the base in relieving it and supplementing it in its action to better distribute and equalize strain and stress which is developed in the machine.

In accordance with my idea, I provide a collar 16 which is fastened on the threads 17 of the shaft. This collar cooperates with a ball bearing race assembly indicated at 18, and the latter cooperates with a self-alining thrust bearing including a beveled ring 19 cooperating with the bevelled surface of a companion seat ring 20. The last named ring presses down upon springs 21 resting on the bed plate. This bed plate is in the nature of an annulus 22 secured by bolts or the like 23 to the crosshead in the frame structure. A central opening is formed in the flange portion 24 to accommodate that portion of the shaft 19 which passes therethrough.

The numeral 25 merely designates a perpendicular axis of the shaft 9. Under this arrangement, I relieve the bottom thrust bearing assembly 13 of excessive weight by providing the top thrust bearing suspended from the spring supporting bed plate and cooperating with the collar 16 carried by the shaft. In a sense, this top thrust bearing, which is supplemental in character in comparison to the lower thrust bearing 13, comprises the bedplate 22 constituting a support for the spring, and said spring serving to support the ring-like portion 19 and 20 to permit freedom of play.

The collar 17 bearing on the ball bearing race 18 brings the upper weight on the parts 19 and 20 which in turn carry the weight to the full compressive action of the coiled spring 24. Thus the upper thrust bearing is a floating bearing and is intimately related to the self-alining roller bearing structure 15. Both of these assemblies greatly aid in relieving the lower thrust bearing 13 of undue and excessive weight and strain.

It is apparent that the companion relationship of the major thrust bearing 13 and the supplemental yielding thrust bearing on the frame is not necessarily restricted to use in a dry pan machine. The fact is, the inventive idea may be incorporated in any machine involving the utilization of longitudinally spaced bearings and a cooperating rotary shaft.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In a structure of the class described, a frame including a horizontal cross piece having an intermediate portion apertured, a rotary shaft extending through and beyond said aperture, and a thrust bearing carried by the frame and cooperable with the adjacent intermediate portion of the shaft, said thrust bearing including a removable bed plate, a plurality of circumferentially spaced coil springs supported thereon, upper and lower contacting beveled rings mounted on the springs, a collar on said shaft, and a ball bearing race interposed between the upper ring and said collar.

2. In a structure of the character described, a frame including a horizontal cross member having an opening therein, an annulus detachably mounted on the lower side of the cross member coaxially with the opening, a flange on the inner periphery of the annulus disposed beneath the opening, a rotatable shaft extending through the annulus and the opening, a series of coil springs mounted on the flanges around the shaft, a substantially plano-concave ring mounted on the springs and encircling the shaft in spaced relation thereto, a substantially plano-convex ring operatively mounted on the plano-concave ring, a bearing race mounted on the plano-convex ring and a collar mounted on the shaft and engaged with the bearing race in a manner to support the shaft thereon.

In testimony whereof I affix my signature.

GEORGE E. KRIDER.